J. G. LEYNER.
COMBINED AIR COMPRESSOR AND INTERCOOLER.
APPLICATION FILED OCT. 1, 1902.

938,004.

Patented Oct. 26, 1909.
11 SHEETS—SHEET 1.

Witnesses:

Inventor:
John George Leyner
By H. S. Bailey, Attorney.

J. G. LEYNER.
COMBINED AIR COMPRESSOR AND INTERCOOLER.
APPLICATION FILED OCT. 1, 1902.

938,004.

Patented Oct. 26, 1909.
11 SHEETS—SHEET 3.

Witnesses:
Clarence H. Lawson
George R. Grieve

Inventor:
John George Leyner
By H. S. Bailey Attorney.

J. G. LEYNER.
COMBINED AIR COMPRESSOR AND INTERCOOLER.
APPLICATION FILED OCT. 1, 1902.

938,004.

Patented Oct. 26, 1909.
11 SHEETS—SHEET 4.

Witnesses:

Inventor:
John George Leyner
By
H. S. Bailey, Attorney.

J. G. LEYNER.
COMBINED AIR COMPRESSOR AND INTERCOOLER.
APPLICATION FILED OCT. 1, 1902.

938,004.

Patented Oct. 26, 1909.
11 SHEETS—SHEET 5.

J. G. LEYNER.
COMBINED AIR COMPRESSOR AND INTERCOOLER.
APPLICATION FILED OCT. 1, 1902.

938,004.

Patented Oct. 26, 1909
11 SHEETS—SHEET 6.

Witnesses:

Inventor:
John George Leyner
By H. S. Bailey
Attorney.

J. G. LEYNER.
COMBINED AIR COMPRESSOR AND INTERCOOLER.
APPLICATION FILED OCT. 1, 1902.

938,004.

Patented Oct. 26, 1909.
11 SHEETS—SHEET 7.

Witnesses:
Inventor:
John George Leyner
By H. S. Bailey Attorney.

J. G. LEYNER.
COMBINED AIR COMPRESSOR AND INTERCOOLER.
APPLICATION FILED OCT. 1, 1902.

938,004.

Patented Oct. 26, 1909.
11 SHEETS—SHEET 9.

Witnesses:
Inventor
John George Leyner
By H. S. Bailey
Attorney

J. G. LEYNER.
COMBINED AIR COMPRESSOR AND INTERCOOLER.
APPLICATION FILED OCT. 1, 1902.

938,004.

Patented Oct. 26, 1909.
11 SHEETS—SHEET 10.

Witnesses

Inventor:
John George Leyner
By H. S. Bailey, Attorney.

UNITED STATES PATENT OFFICE.

JOHN GEORGE LEYNER, OF DENVER, COLORADO.

COMBINED AIR COMPRESSOR AND INTERCOOLER.

938,004. Specification of Letters Patent. Patented Oct. 26, 1909.

Application filed October 1, 1902. Serial No. 125,539.

*To all whom it may concern:*

Be it known that I, JOHN GEORGE LEYNER, a citizen of the United States of America, residing at Denver, in the county of Denver and State of Colorado, have invented certain new and useful Improvements in Combined Air-Compressors and Air-Intercoolers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in air compressors and consists of an improved inter-cooler for air compressing cylinders, and the objects of my invention are; first, to provide means for cooling the air as it is compressed in such a manner that all the air is very thoroughly mixed together and evenly cooled; second, to provide means for preventing air currents from being formed, as the air is compressed, which tends to prevent an even cooling of the air; third, to provide means for passing the air as it is compressed by a circuitous path through a system of tubes arranged in a water jacketed cylinder; fourth, to provide a compressed air inter-cooler in which the air is drawn from a pre-determined source and is compressed in a compound air compressor in such a manner that it is forced to travel in reverse directions and is very thoroughly and evenly mixed up and evenly cooled. I attain these objects by the mechanism illustrated in the accompanying drawings, in which:

Similar characters of reference refer to similar parts throughout the several views.

Figure 25:
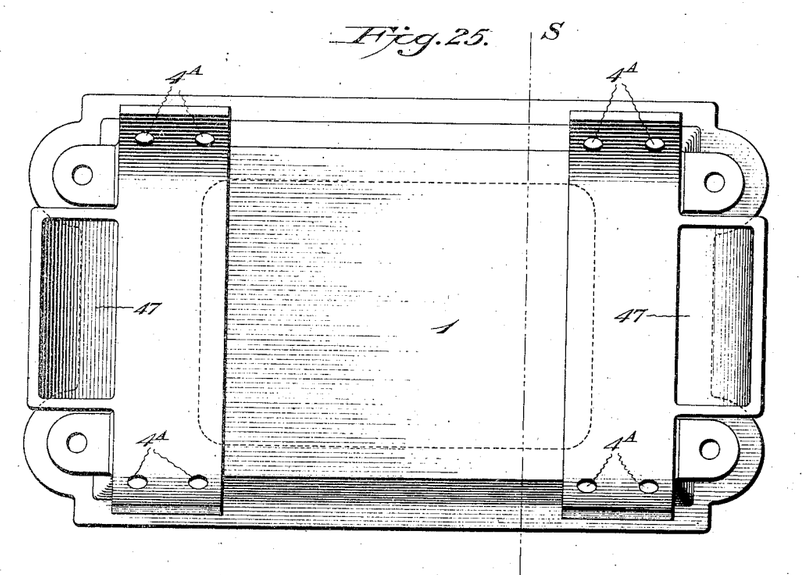
Fig. 25 is a plan view of the bed-plate on which the low pressure cylinder is seated.
Figure 26:
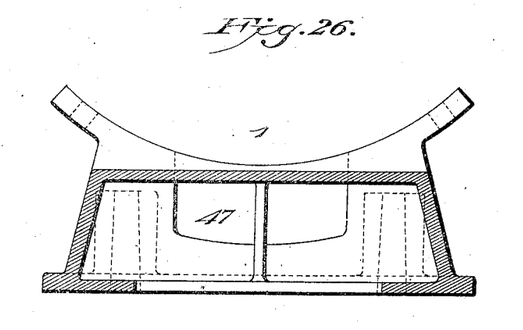
Fig. 26 is a cross section of Fig. 25 on line S.

Referring to the drawings, 1 designates a saddle-shaped bed plate, see Figs. 25 and 26. 2 designates a foundation for the bed-plate. This bed-plate comprises a hollow box-shaped casting having an aperture 3 in its bottom which registers with an air conduit 4 that is formed in the foundation and leads in any desired direction to the atmosphere.

Figure 1:
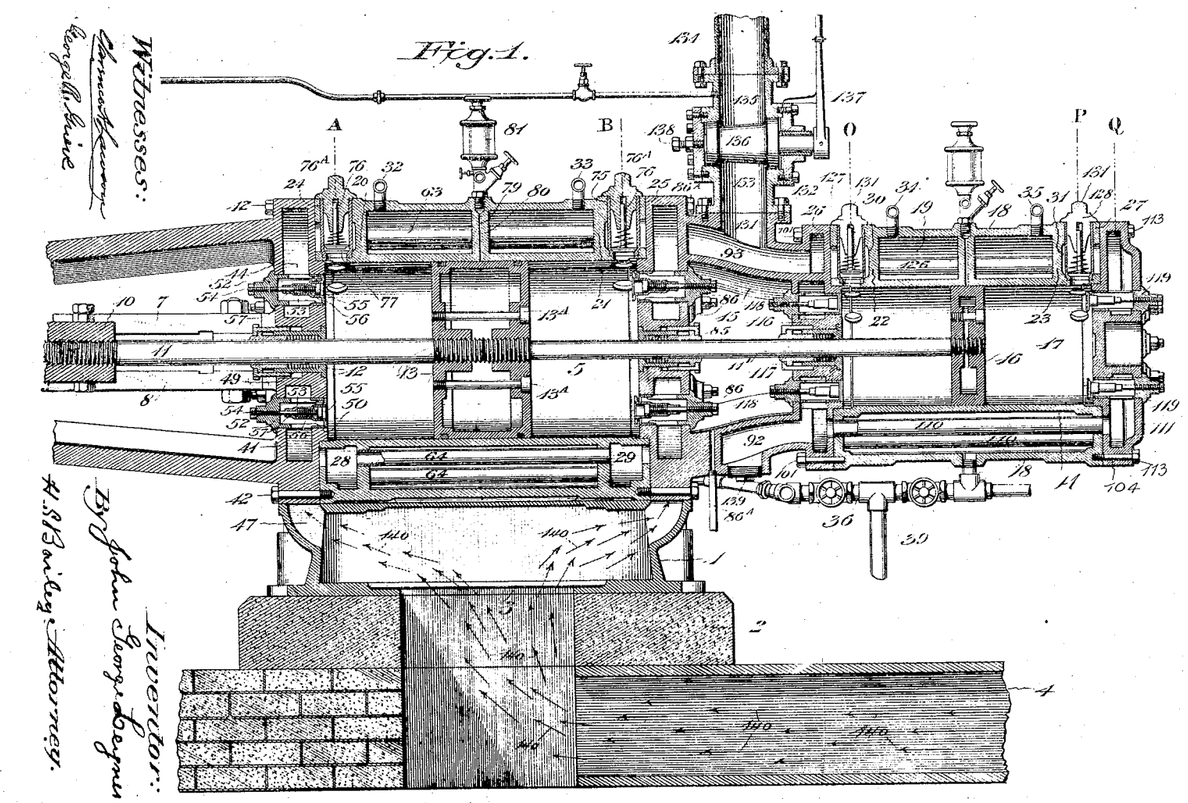
Figure 1 represents a central longitudinal vertical section of an air compressing engine embodying my invention.
Figure 2:
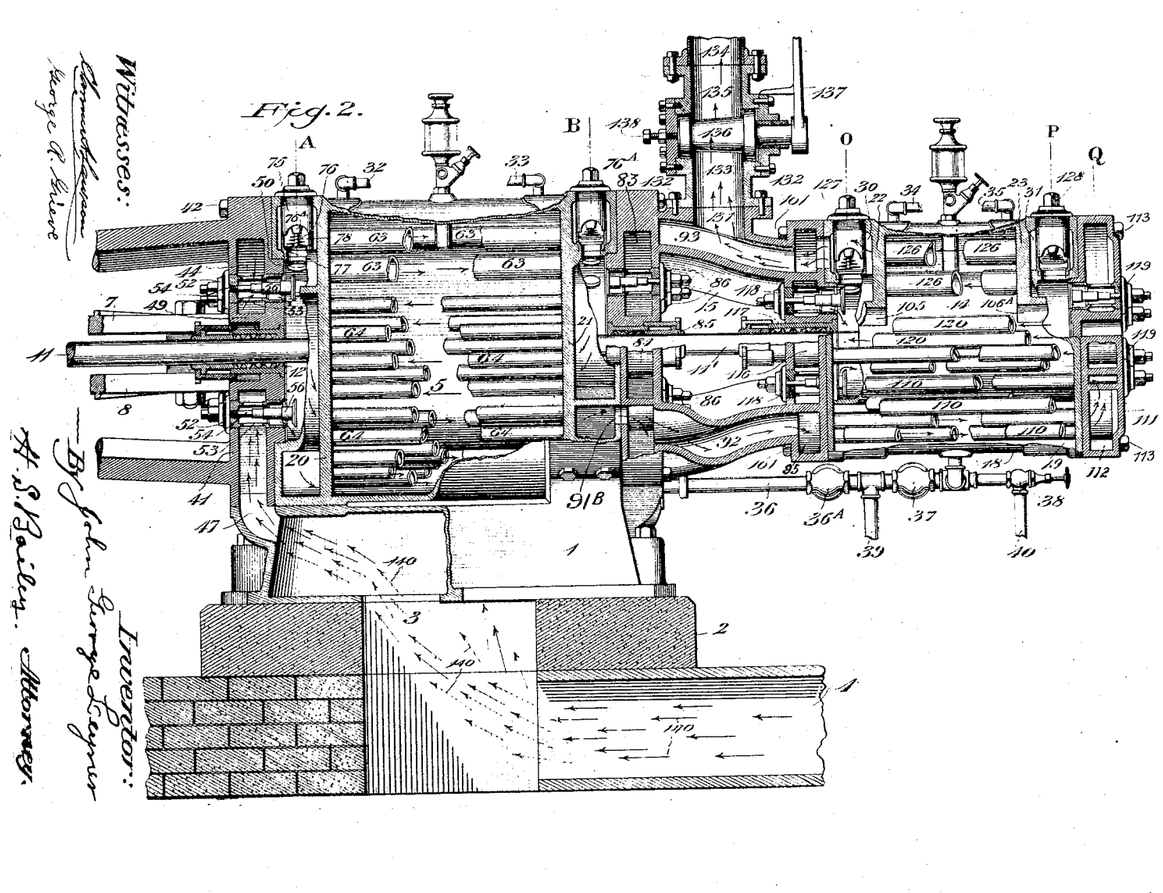
Fig. 2 represents an enlarged longitudinal elevation partially in section, and with the cylinder shells broken away, of the inter-cooler of the low and high pressure cylinders showing the arrangement of the water jacket, the air-pipes, the air-valves and the hollow cylinder-heads of both the low and high pressure cylinders.
Figure 3:
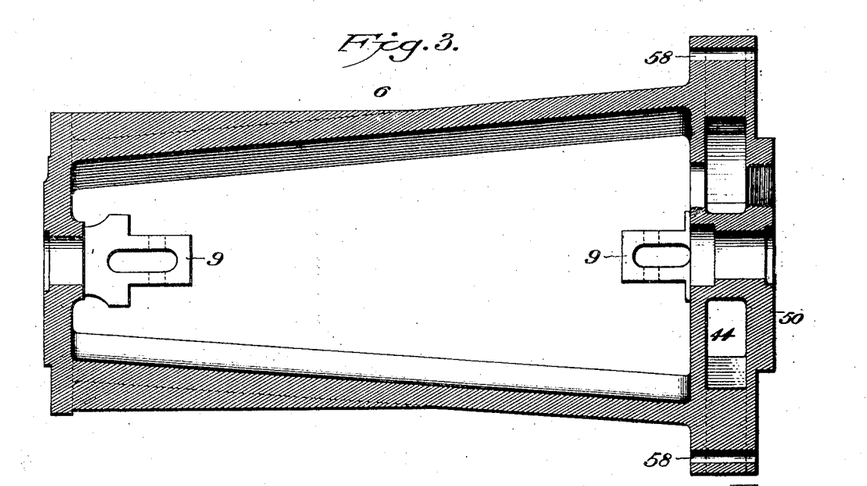
Fig. 3 represents a longitudinal, sectional view of the long distance piece or arm that connects the low pressure cylinder with an operative steam engine or other suitable power.
Figure 4:
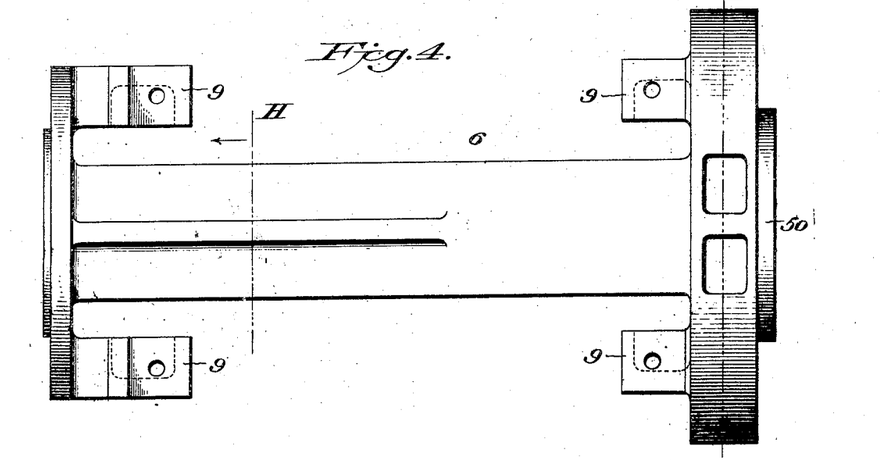
Fig. 4 is a plan view of the long distance piece or arm.
Figure 12:
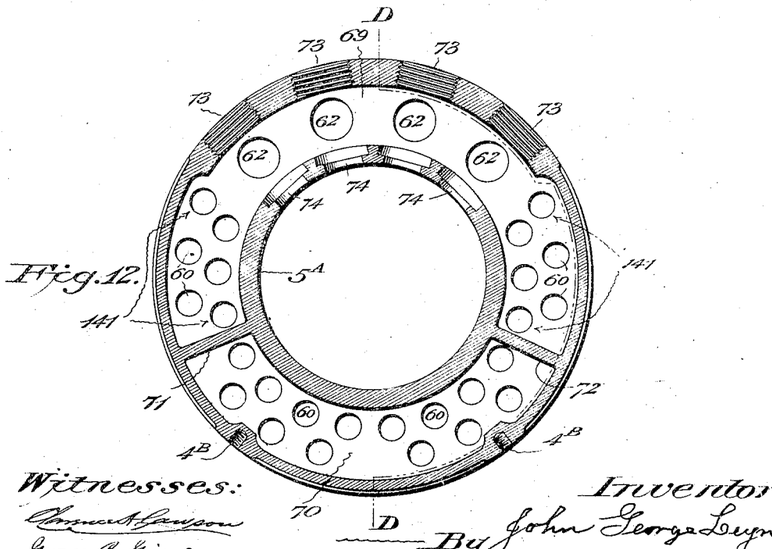
Fig. 12 represents a cross section of the short distance piece end of the low pressure cylinder on line B of Fig. 1, the air-valves not being shown.

5 designates a low pressure water jacketed air compressing cylinder which is seated in and secured to the saddle of the bed-plate by cap-screws which extend through the holes 4^A and thread into the holes 4^B in the cylinder, as shown in Fig. 12. The cylinder 5 is provided with a bore 5^A and is connected by a long distance piece 6, see Figs. 3 and 4, to a steam engine cylinder or other piston actuating power motor, such as electricity or a water wheel, or where desired, a power driven mechanism may be connected to the long distance piece. Only a fragment of the long distance piece is shown in Figs. 1 and 2. The long distance piece forms a housing for guide-ways 7 and 8 which are secured at their ends to the lugs 9. A cross head 10 is slidably mounted in the guide-ways. A piston-rod 11 is threadedly secured to the cross-head and extends through the stuffing-box 12 into the low pressure air compressing cylinder 5 where it is secured to a piston-head 13. This piston head is preferably cast hollow and in one piece. The bolts 13^A are used to brace the two opposite heads of the piston that are reciprocally mounted in the bore thereof, and also to clamp or lock the piston head to the threads of the connecting rod against accidental turning thereon, or displacement. The cross-head is connected by suitable connecting rods with the power end of the compressor. I do not illustrate the power mechanism or the connecting rods as they are well known parts of an air compressing engine and are used to reciprocate the piston heads and rods of the air compressing cylinders.

14 designates a high pressure air compressing cylinder which is secured to the rear end of the low pressure cylinder by a short distance piece 15. The piston-rod 11' is a separate piece which is threaded to the piston-head 13 of the low pressure cylinder extends rearward into the high pressure cylinder and is threadedly secured at its end to a piston-head 16 which is operatively fitted in the bore 17 of the high pressure cylinder. The high pressure cylinder is provided with a water jacket which comprises an outer cylindrical shell 18 surrounding the shell of the piston's bore concentrically, so as to leave a water space 19 between the two shells that surround the piston's cylinder. The low pressure cylinder contains a water jacket of similar construction and arrangement. The water jacket portion of the low-pressure cylinder does not extend the full length of the cylinder, but to within a short distance of each end. In the low pressure cylinder annular walls 20, 21 close the ends of the water space 19 and similar walls 22, 23 close the ends of the water jacket on the high pressure cylinder. In the high pressure cylinder however, there is a portion of its circumference that is formed into a water jacket and does extend completely to the ends of the high pressure cylinder, there being an offset in the annular heads, see Fig. 2, in which the upper portion of the high pressure cylinder is shown with a water-jacket having annular heads 22 and 23, while the cylinder extends beyond these heads at this upper side to annular end walls, while at the lower side the air tubes and water jacket extend to the annular end walls. The cylinders are each provided with end walls. 24, 25 and 26, 27 designate the end walls on the low and high pressure cylinders, respectively. These end walls extend from the piston's bore to the outer shell. Between the annular end walls 24 and 25 of the low pressure cylinder and the heads 20 and 21 of the water jacket of that cylinder air spaces 28 and 29 are formed. Similar air spaces 30 and 31 are also formed between the annular end walls 26 and 27 of the high pressure cylinder and its water jacket heads 22 and 23. The low pressure cylinder is provided with water outlet pipes 32 and 33 and the high pressure cylinder is provided with water outlet pipes 34 and 35, all of which are preferably placed at the top of the cylinders.

Figures 5, 6, 7:
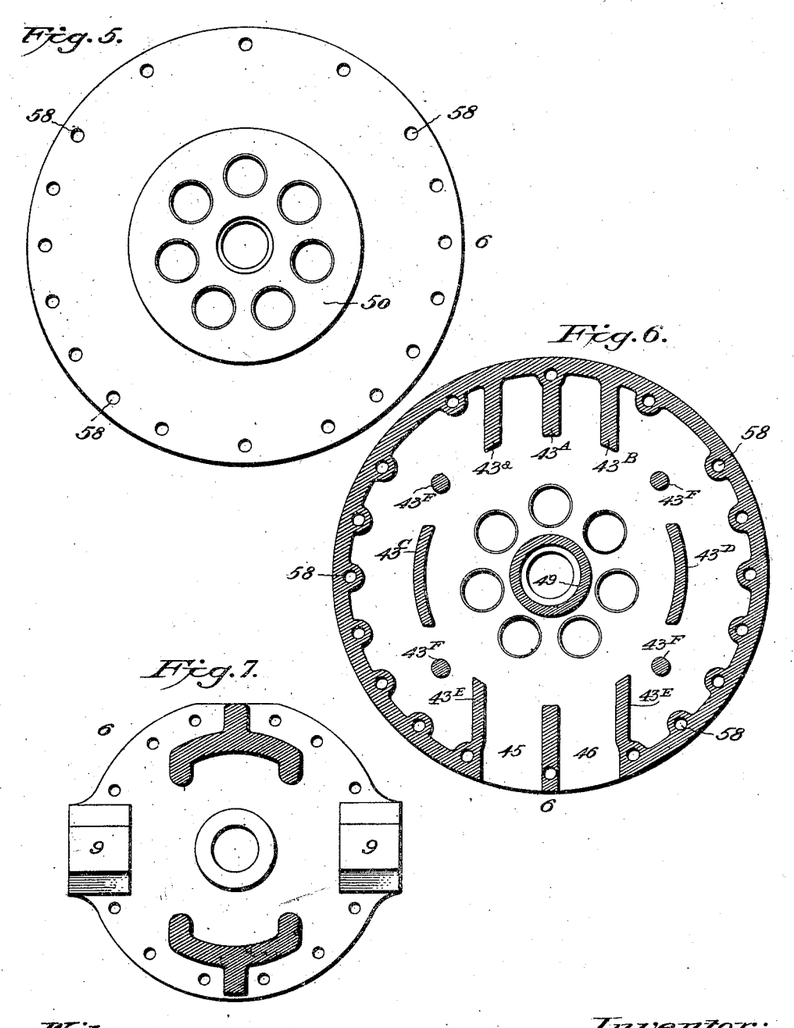
Fig. 5 is an end elevation of the cylinder head end of the long distance piece that connects to the low pressure cylinder.
Fig. 6 is a cross section of the cylinder-head end of the long distance piece on line F of Fig. 4.
Fig. 7 is a cross section of Fig. 4 on line H in the direction of the arrow.

Both cylinders are provided with a water inlet pipe 36 which is preferably arranged to connect the two cylinders together. Valves 36^A, 37 and 38 are placed in the water inlet pipes to control the volume of supply, and pipe 39 leads to the pipe 36 and conveys the cooling water to the air compressor; the pipe 40 is a drain pipe, and valve 38 controls drain water, see Fig. 2. The low pressure cylinder end of the long distance piece is provided with a cylinder head 41 that forms the front cylinder head of the low pressure cylinder, see Fig. 5, which is an end elevation of this cylinder head, and Fig. 6 which is a section on line F of Fig. 4. This cylinder-head is bolted by bolts 42 which are inserted in the holes 43 to the adjacent end of the low pressure cylinder. This cylinder-head is provided with an air space 44. 43^a, 43^A, 43^B, 43^C, 43^D and 43^E designate strengthening ribs as do also the studs 43^F. They extend across the air space from one side to the other of the cylinder head. 45 and 46 are air passages which extend through the periphery of the cylinder head. These air passages register with a passage 47 formed on the adjacent end of the bed-plate 1. The air space 44 extends entirely around the interior of the cylinder-head except a central disk portion 49 is formed, in which the piston rod's stuffing box is positioned.

The cylinder-head is provided with a slightly projecting solid hub portion 50 which extends into and fits a slight counterbore 51 formed in the adjacent end of the cylinder, 5. Through this hub and through the opposite wall of the cylinder-head I bore a plurality of holes in which I set air inlet valves 52. These holes and valves are preferably arranged in a circle concentric to the axis of the piston and cylinder and within the radius of the piston's bore. These air inlet valves comprise a housing 53 which is inserted and secured to the cylinder head from the cross-head side of the cylinder-head. A valve-stem 54 is secured to the housing at one end and supports a disk 55 at its opposite end and a valve 56 which is made in the form of a sleeve fits slidably on the valve-stem. A spring 57 is interposed between the disk at the end of the valve stem and the end of the valve.

A valve-seat is formed on the cylinder side of the valve casing against which the valve is normally held by the spring 57. These valves consequently connect the passages from the air space in the cylinder head which is in communication with the atmosphere, through the bed-plate and air conduit in the foundation, with the interior of the cylinder.

Figure 8:
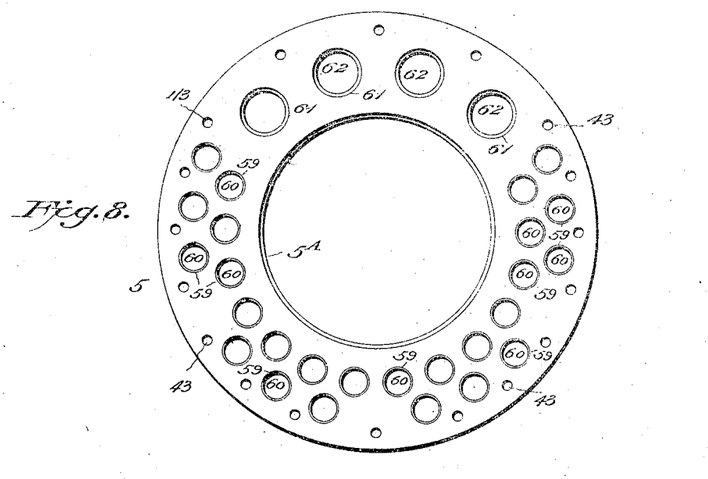
Fig. 8 is an end elevation of the long distance piece end of the low pressure cylinder.

The long distance piece end of the low pressure cylinder is shown in Fig. 8. 5^A designates the piston's bore of the cylinder, and 51 the counterbore at the end of the cylinder. 58 designates the holes in which the bolts 42 screw, that fasten the cylinder head of the long distance piece end to the low pressure cylinder. 59 designates apertures through the front and rear ends of the low pressure cylinder, adjacent to the water jackets' partitions 20 and 21, where holes 60 are also formed, of slightly less diameter, registering axially with the holes 59 in the head ends of the cylinder. A group of large holes 61 are formed through the head ends of the top portion of the low pressure cylinder. These holes permit the air tubes to be introduced into the water jackets and are closed by the cylinder heads. Holes 62 of smaller diameter are drilled in axial alinement with each one of the holes 61 through the front and rear heads of the water jacket, and in the holes 62 of the heads of the water jacket I place tubes 63, which are fitted and calked water tight to the water jacket heads, 20 and 21. These air pipes extend axially of the cylinder through the water jackets space only, and extend from one water jacket head 20 to the opposite water jacket head 21, see Figs. 1 and 2.

Figure 9:
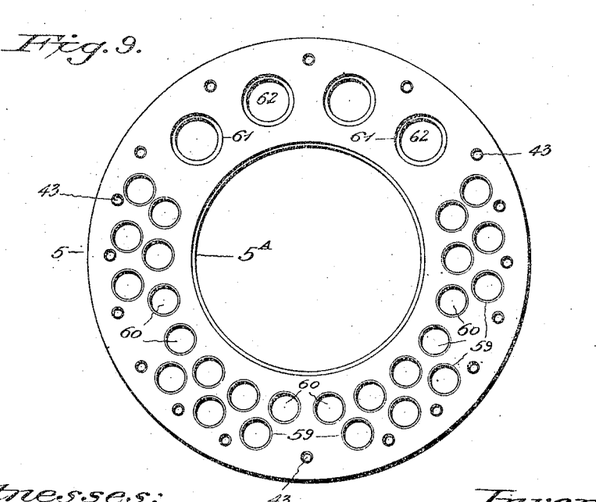
Fig. 9 is an end elevation of the short distance piece end of the low pressure cylinder.
Figure 10:
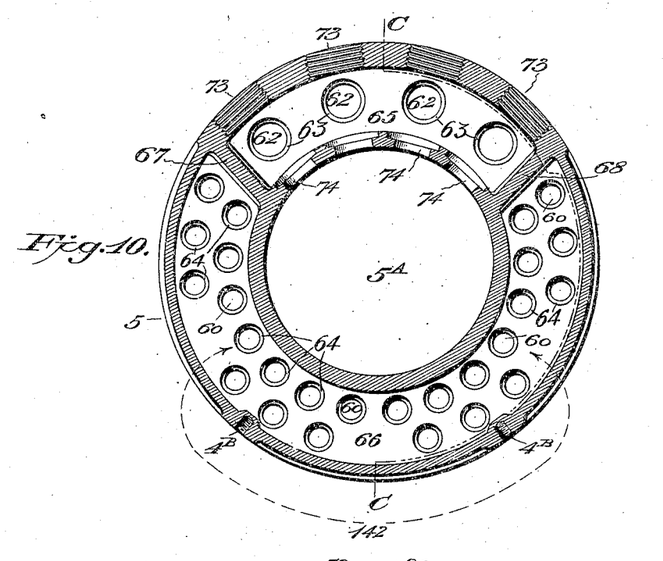
Fig. 10 represents a cross section of the long distance piece end of the low pressure air compressing cylinder on line A of Fig. 1, the air-valves not being shown.
Figure 11:
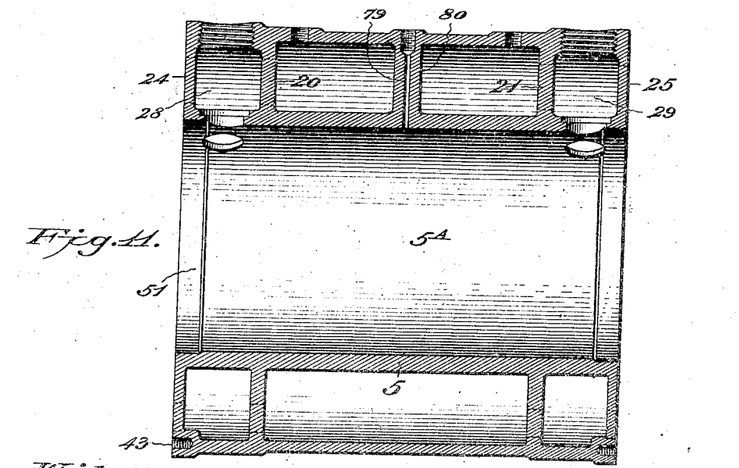
Fig. 11 is a central longitudinal section through the low pressure cylinder.

The air tubes 63 are shown in Figs. 1 and 2, while the holes in the heads 20 and 21 in which they are calked, are shown in Figs. 8 and 9. Groups 141 of smaller air tubes 64 extend across the water jacket, at each side of the cylinder while a similar group 142 extends across the under side of the water jacket. The air tubes are broken away as shown in Fig. 2 in order to show the direction the air flows through them. The air space in the front head end of the cylinder is divided into two compartments, 65 and 66, by the partitions, 67 and 68, which extend across the space between the end of the water jacket and the end of the cylinder, see Fig. 10, which is a section of the front head end of the cylinder on line A of Fig. 2. These partitions are positioned to inclose in the upper compartment the group of large air pipes 63. The compartment formed between the partition 67 and 68 is in open communication with them, while the air compartment below these partitions is in open communication with all of the group of small pipes 64. The air space in the rear end of the cylinder is also divided into two compartments, 69 and 70, by two partitions 71 and 72 as shown in Fig. 12, which is a cross section of this end of the cylinder on line B of Fig. 2. These partitions are arranged at the lower portion of the air cylinder and divide the air space so that its upper portion is in open communication with the large air tubes at the top of the cylinder and also a group of the smaller air tubes, while the air compartment below the partitions is in open communication with the balance of the air tubes at the bottom portion of the cylinder. In both the front and rear cylinder heads of the low pressure-cylinder I place a plurality of air valves, securing each in radial holes 73 and 74, in the shells of the cylinder. The holes 73 are threaded and a casing 75 is threadedly secured in each hole. This casing comprises a sleeve that fits at its lower end into the hole 74, a valve stem 76 having a valve at its lower end is supported slidably in the top of the casing; a valve seat 77 is made in the lower end of the casing and a conical-shaped coiled, expansive spring is placed between the valve and the lower end of a plug, 76^A, and normally holds the valve against its seat. Openings 78 are formed in opposite sides of the casing to allow the air to flow from the valve into the air compartment; thus the air that is compressed in the cylinder is forced through these valves into the air compartments, from which it flows into and through the air-tubes of the water jacket, as will be more fully described hereafter. I have illustrated four of these outlet valves; a larger number being used with cylinders of greater diameter.

An oil hole 79 is provided through a stem of metal 80 that extends between the shells of the cylinder, and an oil cup 81 is threadedly secured in the oil-hole to lubricate the cylinder.

Figures 13, 14, 15:
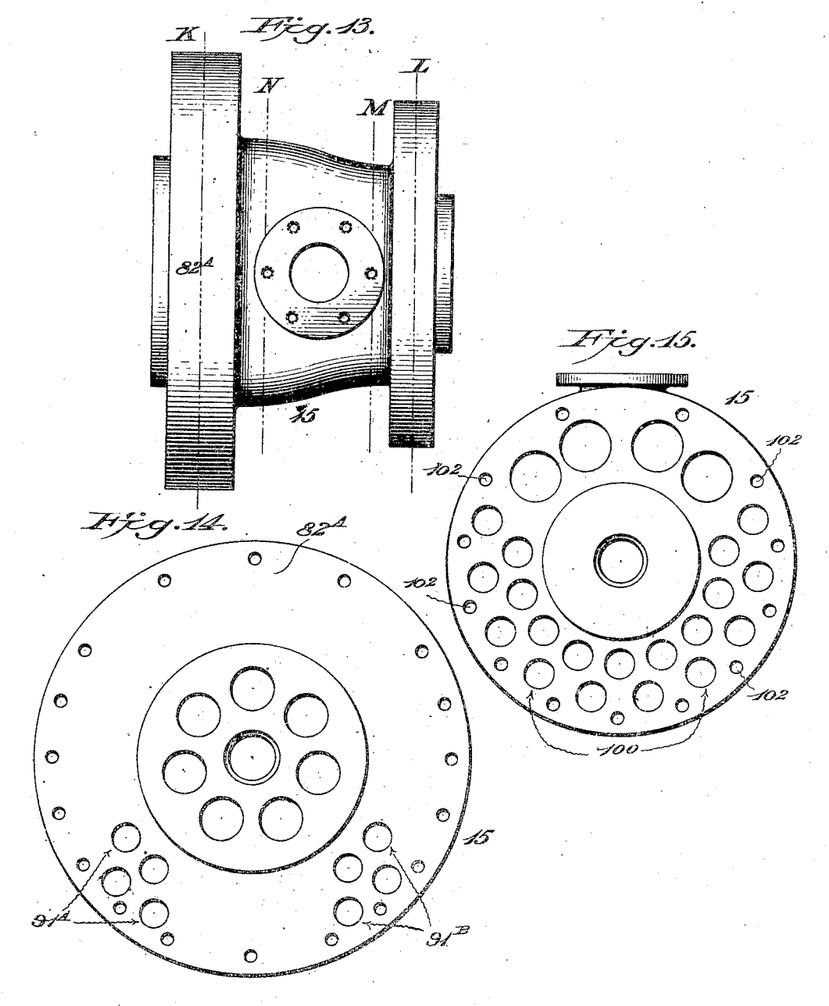
Fig. 13 is a plan view of the short piece that connects the low and high pressure cylinders together.
Fig. 14 is an end elevation of the low pressure cylinder end of the short piece shown in Fig. 13.
Fig. 15 is an end elevation of the short piece showing the high pressure cylinder end of the short distance piece.
Figures 16, 17, 18:
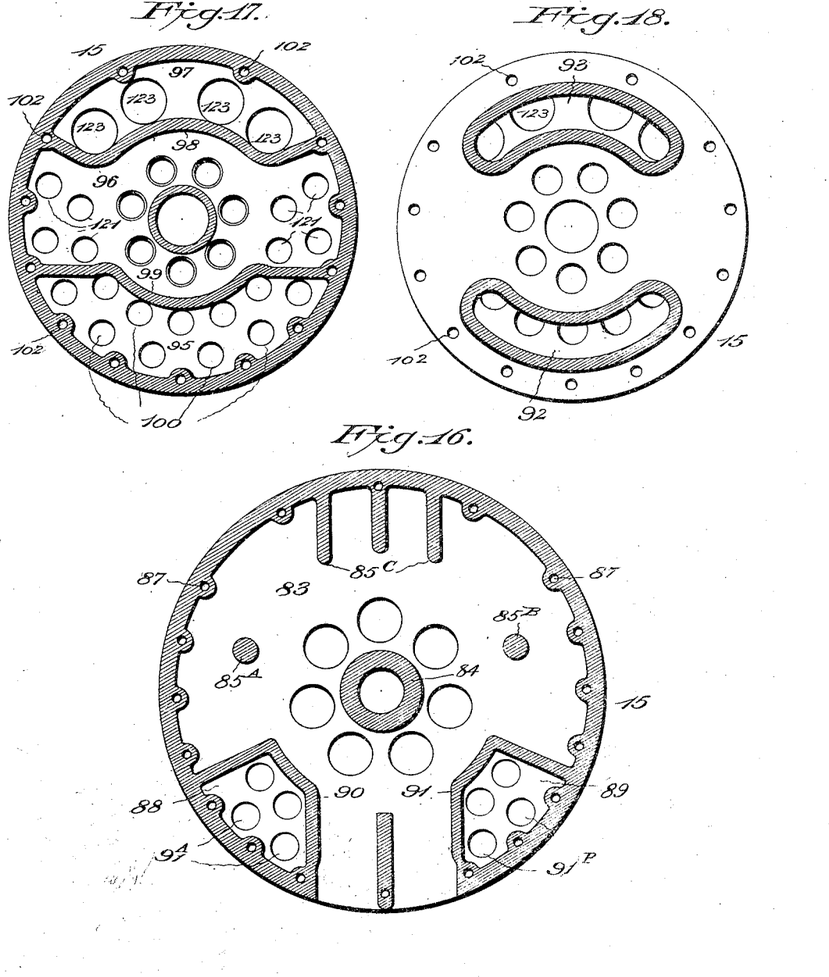
Fig. 16 is a section of the low pressure end of the short piece on line K of Fig. 13.
Fig. 17 is a section of the high pressure cylinder end of short distance piece on line L of Fig. 13.
Fig. 18 is a section of Fig. 13 on line M.
Figure 19:
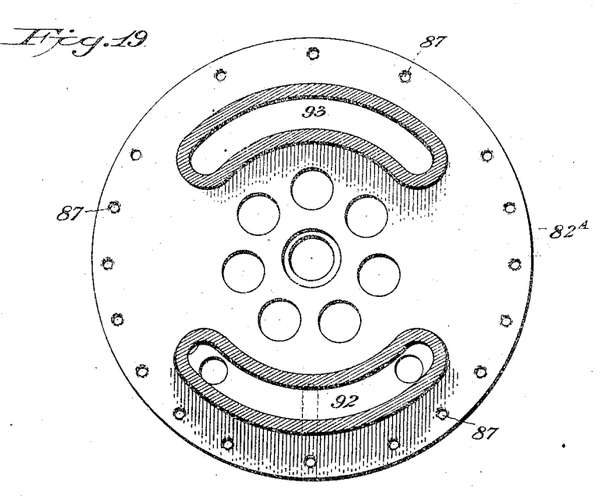
Fig. 19 is a section of Fig. 13 on line N.
Figure 20:
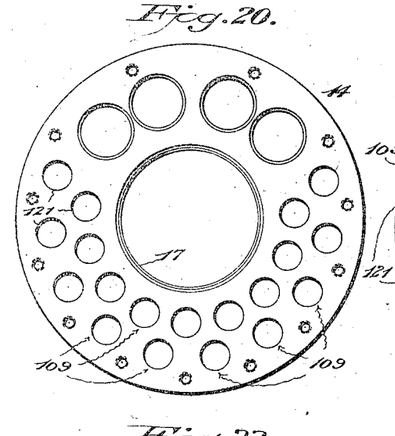
Fig. 20 is an end elevation of the short distance piece end of the high pressure cylinder. Both ends of this cylinder are alike.
Figure 21:
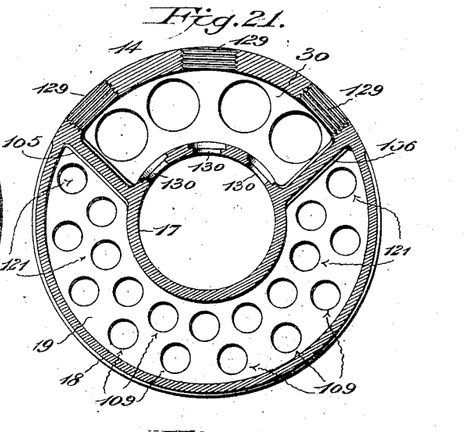
Fig. 21 is a section of the high pressure cylinder on line O of Fig. 1; a section on line P would be like Fig. 21.

At the rear end of the low pressure cylinder a short distance piece 15, see Fig. 13, is employed to connect the low and high pressure cylinders together and to convey the compressed air from the low pressure cylinder to the high pressure cylinder. Cylinder heads are formed on each end of this short distance piece. The cylinder-head 82ᴬ connects the low pressure cylinder to the short distance piece. An elevation of the end of this rear cylinder-head is shown in Fig. 14. This rear cylinder-head is provided with an interior air space 83 and with a hub portion 84 in which a stuffing box 85 is positioned, through which the piston rod reciprocates. 85ᴬ and 85ᴮ and the ribs 85ᶜ are strengthening pieces which extend across the air space. The air space surrounds the hub portion, extends through the bottom of the head and registers with the air chamber of the bed-plate, see Fig. 16, which is a section of Fig. 13 on line K. A preferably circular row of air inlet valves 86 similar in construction to those in the end of the front cylinder-head is operatively secured in the rear head to admit the air from the air compartment of that end of the cylinder. This rear cylinder-head and the short distance piece of which it forms a part is bolted by means of bolts 86ᴬ, which are inserted through the holes 87 to the rear end of the cylinder. At the lower portion of this rear cylinder head there are two independent air spaces formed, 88 and 89, by the partitions 90 and 91. These air spaces have air passage holes 91ᴬ and 91ᴮ shown in the end view of Fig. 14. These two groups of air passage holes in this end of the short distance piece are the only air passages leading from the low pressure cylinder into the adjacent end of the short distance piece, as otherwise the end is a solid flange end. These two air passages 88 and 89 conduct the air from the low pressure cylinder across the rear cylinder head and deliver it into an air conduit 92 that forms the lower portion of the short distance piece and extends from its low pressure cylinder end to its high pressure cylinder end. At the upper portion a similar air conduit 93 is formed that connects the two cylinder head ends of the short distance piece together. The conduit 82 conveys the air from the air compartment of the rear cylinder-head of the low pressure cylinder, which is the front end of the short distance piece to the front cylinder head of the high pressure cylinder, which is the rear end of the short distance piece. A section across the short distance piece through these two air conduits close to the front end on line N, Fig. 13, is shown in Fig. 19, and a section on line M Fig. 13, close to the opposite end is shown in Fig. 18. The elevation of the rear end or high pressure cylinder head is shown in Fig. 15 and a section through this end is shown in Fig. 17. This cylinder-head is also a hollow air-head and is divided into three air compartments 95 and 96 and 97 by the two transverse partitions 98 and 99, see Fig. 17; consequently the air that flows through the lower conduit 92 of the short distance piece enters the air compartment 95 of its high pressure cylinder-head and then flows through the lower group of air passage holes 100 in its end flange. The number of these air passage holes 100, varies with cylinders of different diameters. The high pressure cylinder is bolted by bolts 101 through the holes 102 to the adjacent cylinder head end of the short distance piece. An end elevation of the front end of the high pressure cylinder is shown in Fig. 20 and a cross section through this end on line O of Fig. 2 is shown in Fig. 21.

Figures 22, 23, 24:
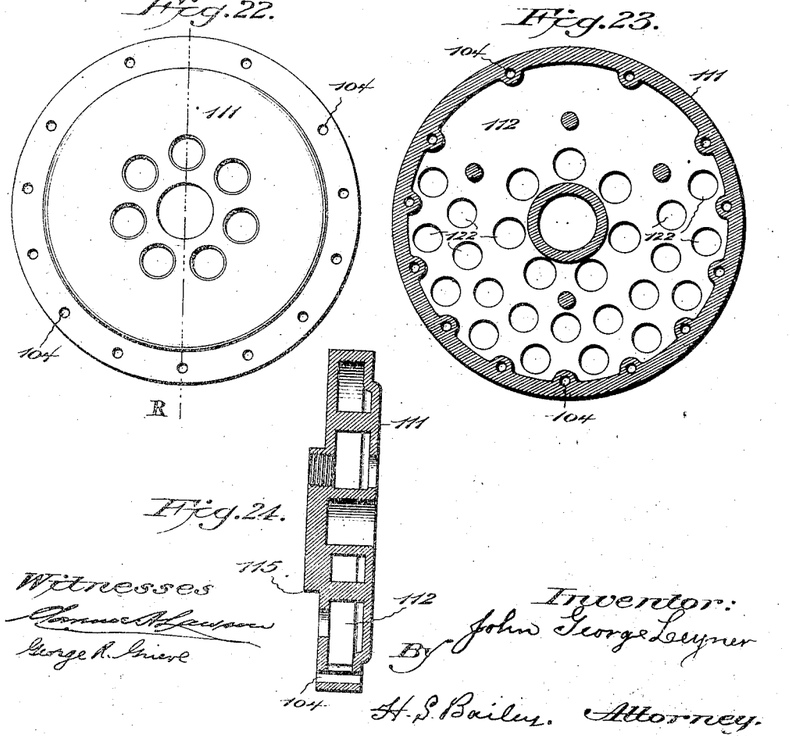
Fig. 22 is an end elevation of the rear air-head.
Fig. 23 is a vertical section through said head on line Q of Fig. 1.
Fig. 24 is a cross section of Fig. 23.

The high pressure cylinder is constructed substantially like the low pressure cylinder, but is smaller. It is provided at its ends with air compartments 30 and 31. These are confined however to the upper end of the cylinder by partitions 105 and 106ᴬ. Below these partitions the water jacket 19 extends to the ends of the cylinder. The high pressure cylinder is provided with a piston bore 17 and a water jacket 19. This water jacket is constructed like that of the low pressure cylinder, but its heads are the ends of the cylinder below the air compartment partitions 22 and 23 in its ends. Its water jacket is also provided with air tubes to conduct the air from one end to the other, as will be more fully described hereinafter, almost the same number and arrangement of tubes being preferably used. The short distance piece end of the high pressure cylinder is provided with air passage holes 100 which register with the ends of holes 109, see Fig. 21, formed in the end of the high pressure cylinder in which are secured one end of the air tubes 110, the opposite ends of which are secured to the opposite or rear end head of the water jacket. The lower group of air tubes 110 of this cylinder register with the lower group of air passage holes 100 in the end of the rear cylinder head of the short distance piece that open from the air compartment 95; consequently the air that passes from the low pressure cylinder through the lower conduit 92 into the compartment 95 passes directly into the lower tubes 110 and passes to the rear cylinder head 111 of the cylinder, which is provided with an air compartment 112. An end elevation of the rear cylinder head is shown in Fig. 22. A cross section also of the rear cylinder head is shown in Fig. 23 and a transverse section of the rear cylinder head on line R of Fig. 22 is shown in Fig. 24. Its front end is provided with the same group of air passage holes as the cylinder itself below its transverse or axial partitions 105 and 106ᴬ, which lead into the air compartment 112. The rear cylinder head is bolted to the cylinder by bolts 113 which pass through the holes 104.

The rear cylinder-head is provided with a central hub portion 115 that extends into the counterbore of the cylinder. The front cylinder head of the high pressure cylinder is provided with a central hub 116 in which a stuffing box 117 is formed, through which the piston-rod extends to the piston head, which is operatively fitted to the bore of the cylinder. A circular row of air inlet valves 118 are formed around the hub portion of the cylinder-head. These valves are constructed and arranged and secured in the opposite ends of the cylinder head similar to the air inlet valves in the opposite ends of the low pressure cylinder. They are consequently seated to admit air from the central air compartment 96 of the cylinder-head into the piston-bore of the cylinder. A similar circular set of air inlet valves 119 is arranged around the center of the rear cylinder-head 111. These also open to admit air from the air compartment of the rear cylinder-head into the piston's bore.

The central air compartment 96 of the front cylinder-head communicates with the rear cylinder head through a group of air tubes 120 which extend through the water jacket from one end of the high pressure cylinder to the other and register opposite the air passage holes 121 in the front head, and 122 in the rear head, as these tubes 120 are the only means of the air flowing to the air compartment 96 and its valves in the front head. The air compartment 97, of the front cylinder head communicates through the large air passage holes 123 with the air compartment 30 in the adjacent end of the cylinder which is formed by the partitions 105 and 106ᴬ, and the front head end of the cylinder and the head 22 of this end of the water jacket, and a similar air compartment 31 is formed in the rear end of the cylinder by the head 23 of the water jacket and the rear head end of the cylinder. These two air compartments are connected together by the large air tubes 126 which are secured to the heads of the water jacket.

In each of the air compartments 30 and 31 at opposite ends of the high pressure cylinder I arrange a group of outlet valves 127 and 128, the number varying with cylinders of different diameters. These valves are arranged radially in the holes 129 and 130 in the front end of the cylinder and in similar holes in the rear end of the cylinder. These holes are formed in the shell of the bore of the cylinder and of the shell of the air compartments respectively. The valves are similar in construction and arrangement and are seated in the same way as the outlet valves of the low pressure cylinder and are arranged and adapted to control the passage of the air compressed in the cylinder into the air compartments. In the section in Fig. 21 of this cylinder these valves are not shown. These valves are threaded into the holes 129 and are provided with wrench fitting hubs 131 at their tops by which they are screwed into the threaded apparatus and they are seated in the holes 130 which connect the air compartments with the bore of the cylinder. In the center of the top conduit 93 of the short distance piece a flanged aperture 131 is formed upon which is screwed by bolts 132 a common form of plug valve 133. A pipe 134 is secured to the valve and conveys the compressed air to a place of storage or use. This valve comprises a casing 135, a valve 136 and an operating handle 137. The seat of the valve is governed by a screw 138. In the bottom of the lower air conduit 92 of the short distance piece I place a plug 139 which is used to discharge the air, whenever it is desired to use or take from the compressor a supply of air from the low pressure cylinder.

The operation of my air compressor air intercooler is as follows: A supply of cold water is connected to the water inlet pipes of the water jackets and is kept circulating through the water jackets to cool the air compressed in the cylinders and a reciprocating motion is given to the cross-head piston-rod and the pistons in the cylinders by any suitable application of power to them. On the rearward strokes of the piston of the low pressure cylinder the air is drawn in the cylinders through the group of air inlet valves in its front head that surround the piston-rod. This air flows in the direction of the arrows 140 from the air conduit through the air chamber in the bed-plate. The air drawn into the cylinder by the suction of the piston is on the return stroke compressed and forced out of the cylinder through the air outlet valves into the air compartments 65 and travels through the large air tubes 63, to the opposite end of the cylinder into the air compartment of the rear end, 69 from which it returns through the two groups 141, see Fig. 12, in which these groups of six tubes each are shown on opposite sides of the cylinder. The air is thus delivered to the front end of the cylinder below the partitions 67 and 68, and there flows through the group 142 of the fourteen air pipes 64, that lie around the bottom of the water jacket to the rear end from which it passes into the air compartments 88 and 89 of the rear cylinder head and through the lower conduit 92 of the short distance piece into the lower compartment 95 and through the lower tubes 110 of the high pressure cylinder to the air compartment 112 of the rear cylinder-head, from which it travels to the central compartment 96 of the front cylinder-head of the high pressure cylinder through the group of tubes 120 and is drawn into the high pressure cylinder through the circular group of air inlet valves 118 by the rearward strokes of its piston, which on its forward stroke compresses it and forces it through the air outlet valves into the air compartment 97, from which it flows through the upper air passage 93 to the air outlet valve 133 and to a place of storage or of use.

The low pressure piston on its forward stroke draws air from the air conduit and bed plate air-chamber into the air compartment 83 of its rear cylinder head and from this compartment through the circular group of air inlet valves 86 that surround the piston rod of this cylinder head into the rear end of the cylinder and on its rearward strokes compresses this air and forces it through the air outlet valves 76ᴬ into the air-chamber 69 where it mingles with the compressed air from the forward end of the cylinder and flows with it through the groups 141 of tubes 64 to the front of the cylinder and with it through the high pressure cylinder to the air outlet valve, as above described. The rear end of the high pressure cylinder also receives air on its forward strokes from the entire volume that flows from the low pressure cylinder into its rear cylinder-head, through the circular group of air inlet valves 119 in its end and on its rearward strokes compresses and forces the air out through the outlet valves 128 into the air compartment 31 from which it travels through the large air tubes 126 into the air compartment 30 and through the upper air conduit 93 through the relief valve to storage or use.

The air compartment in the cylinder-heads and the reverse directions in which the air travels in passing through the air compressing cylinder thoroughly mixes the air, brings it rapidly in contact with the coolest portions of the water jacket and effectually prevents the air from forming currents through any particular tubes of those it passes through; consequently the compressed air as it leaves the air compressor is of an evenly cool temperature throughout.

While I have illustrated the preferred arrangement and number of tubes, outlet valves, inlet valves, and air compartments of my air compressor and intercooler, I do not wish to be limited to the exact construction shown, as my invention contemplates the use of a plurality of reverse paths for the compressed air to travel through, with air compartments or enlarged air chambers or spaces at the ends of said reverse paths in which the air from the various paths can mix and mingle together and a number of changes could be made without departing from the spirit of my invention.

My patent No. 849,333, granted April 2, 1897, contains claims which are generic to those made herein.

Having described my invention, what I claim as new and desire to secure by Letters Patent, is:

1. An air compressor and cooler, comprising low-pressure and high-pressure cylinders and pistons, a water-jacket surrounding the low-pressure cylinder, continuous air passages extending through said water-jacket and arranged to carry compressed air delivered by each stroke of the piston in said low-pressure cylinder, a conduit for delivering compressed and cooled air from the low-pressure to the high-pressure cylinder, and an independent air cooler and outlet for the high-pressure cylinder.

2. An air compressor and cooler, comprising low-pressure and high-pressure cylinders and pistons, a water-jacket surrounding each cylinder, continuous air passages extending through each jacket and arranged to carry compressed air delivered by each stroke of the piston in each cylinder, a conduit for delivering compressed and cooled air from the low-pressure to the high-pressure cylinder, and an air outlet for the high-pressure cylinder.

3. An air compressor and cooler, comprising low-pressure and high-pressure cylinders and pistons, valved air inlets to the low-pressure cylinder, a valved outlet and air compartment at each end of the low-pressure cylinder, continuous cooling passages connecting said compartments and arranged to carry compressed air delivered by each stroke of the low-pressure piston, a conduit for delivering compressed and cooled air from the low-pressure to the high-pressure cylinder, and an air cooler and outlet for the high-pressure cylinder.

4. An air compressor and cooler, comprising low-pressure and high-pressure cylinders and pistons, valved air inlets to the low-pressure cylinder, a valved outlet and air compartment at each end of each cylinder, continuous cooling passages connecting the compartments of each cylinder and arranged to carry compressed air delivered by each stroke of each piston, an air conduit connecting one compartment of both cylinders, and an air outlet for the high-pressure cylinder.

5. An air compressor and cooler, comprising low-pressure and high-pressure cylinders and pistons, valved air inlets to the low-pressure cylinder, a valved outlet and air compartment at each end of each cylinder, a water jacket surrounding each cylinder, continuous air pipes extending through each of said water jackets from one compartment to the other and arranged to carry compressed air delivered by each stroke of each piston, partitions subdividing the air compartments into sections which communicate with different groups of pipes, valved ports arranged to deliver air from each end of each cylinder into an air compartment, an air conduit connecting one compartment of both cylinders, and an air outlet for the high-pressure cylinder.

6. In a combined air compressor and air intercooler, the combination with the low-pressure cylinder, its piston and its piston rod, the bed-plate and the rear cylinder head, of a distance piece extending from said rear cylinder-head and divided into arms, a cylinder-head at the opposite end of said distance piece containing an air compartment, an air exit passage in one arm of said distance piece, an air compressing cylinder secured to the rear-cylinder-head of said distance piece and arranged in communication with the exit passage in the arm of said distance piece, a stuffing-box in each of the cylinder heads of said distance piece, a group of air inlet valves in the rear cylinder head of said distance piece arranged to admit air to said rear cylinder, and means including groups of air pipes which pass through a water jacket, for conveying air from said low-pressure cylinder to said rear cylinder, substantially as described.

7. In an air compressor and air intercooler, the combination with the bed-plate having air passages, the low pressure cylinder and the high pressure cylinder; of the short distance piece comprising the oppositely arranged hollow arms, having a cylinder-head at one end adapted to form the rear cylinder-head of said low pressure cylinder, and a cylinder-head at the opposite end adapted to form the front cylinder head of said high pressure cylinder, two separated air passages in the front cylinder head of said short distance piece arranged to convey air from said low pressure cylinder through one of the hollow arms of said short distance piece to the opposite cylinder-head, an air compartment in said front cylinder head arranged to receive air from said bed-plate, and a plurality of air inlet valves arranged to admit air into said low pressure cylinder, substantially as described.

8. In an air compressor and air intercooler, the combination with the bed-plate having an air compartment, of the long distance piece having a cylinder-head provided with an air compartment, the low pressure and high pressure cylinders provided with water-jackets and having connected air compartments at their ends, the pistons and the piston-rod, the short distance piece comprising the two separated hollow arms having a cylinder-head at one end adapted to form the rear cylinder-head of said low-pressure cylinder, and provided with an air compartment connected with the air passage of said bed-plate and with two independent air spacers in communication with a predetermined group of the air tubes of said low-pressure cylinder, the lower hollow arm of said short distance piece arranged to connect with said two independent air passages in said cylinder-head of said low pressure cylinder, and having the cylinder-head at its opposite end constituting the front cylinder-head of the said rear cylinder and containing three independent air compartments, a rear cylinder head on said high pressure cylinder, a group of air tubes arranged and adapted to connect with said air compartments, and means including a plurality of air inlet and air outlet valves in both cylinders for compressing air in said cylinders and forcing it to travel in reverse directions through separated groups of air tubes through said water jackets, substantially as described.

9. In an air compressor and air intercooler, the combination with the low and high pressure cylinders, the piston-rod and the pistons arranged in axial alinement, of a short distance piece between said cylinders comprising two independent air conduits having a cylinder-head at each end arranged to form the rear cylinder head of the low pressure cylinder and the front cylinder-head of the high pressure cylinder, each of said cylinder-heads being arranged into a plurality of independent air compartments, at least two corresponding compartments in the adjacent heads being connected by said air conduits; a water jacket surrounding each of said cylinders, air compartments in the ends of said cylinders, air tubes in said water jackets and means including air inlet and outlet valves arranged to admit and to discharge air from said cylinders for compressing and cooling air, substantially as described.

10. In an air compressor and intercooler, the combination with the bed-plate having an air passage opening into the atmosphere, and a high-pressure cylinder, of a water jacket surrounding said cylinder intermediate of its ends, air compartments in the ends of said cylinder, a partition in the front end air compartment of said cylinder above the central portion of said cylinder and forming two compartments, a partition in the air compartment in the opposite end of said cylinder, below the central portion of said cylinder and forming two compartments, and separate groups of air tubes connecting two corresponding air compartments, whereby the air compressed in said cylinder is caused to flow in reverse directions through said water jacket, substantially as described.

11. In an air compressor and air intercooler, the combination of the long distance piece, the bed-plate, the low pressure cylinder and the short distance piece having an air passage through it from said low pressure cylinder and a valve-controlled air exit passage, with the high pressure cylinder having a front cylinder-head comprising a part of said short distance piece and containing three independent air compartments, and a rear cylinder-head containing one air compartment, a water jacket surrounding said cylinder, air compartments between the ends of said water jacket and the ends of said cylinder at the upper portion of said cylinder, a group of air outlet valves leading from said cylinder into said air compartments, a group of air inlet valves in each cylinder head arranged to admit air to said cylinder, a group of air tubes extending through said water jacket and arranged to conduct air from the lower air compartment of said front cylinder-head through said water jacket to the air compartment of said rear cylinder-head, an independent group of air tubes extending through said water jacket and arranged to convey air from said rear cylinder head to the central air compartment of said front cylinder head and an independent group of air tubes in connection with said air outlet valves arranged to conduct the air from the rear end of said cylinder through said water jacket to the valve-controlled exit of said short distance piece, substantially as described.

12. In an air compressor and air intercooler, the combination of the low and high pressure cylinders, the pistons and piston-rod and the long and short distance pieces having cylinder heads provided with air compartments and adapted to form the front and rear cylinder-heads of the low pressure cylinder and the front cylinder-head of the high pressure cylinder, the water jackets surrounding said cylinder, means for introducing and discharging a continuous supply of cold water to said water jackets, air compartments in said cylinders between the ends of the water jackets and said cylinder-heads, a plurality of air pipes extending through said water jackets and a plurality of partitions arranged in said air compartments to divide said air tubes into predetermined groups of air passages and to cause the air to flow in reverse directions from one end of said cylinders to the opposite end, with suitable air inlet valves for admitting air to said cylinder, and air outlet valves for controlling its passage out of said cylinders, substantially as described.

13. In an air compressor and intercooler, the combination of the low and high-pressure cylinders, the pistons and piston-rod, the short distance piece connecting the cylinders, a water-jacket surrounding each cylinder, a plurality of air tubes extending through each water-jacket, and means including air compartments for guiding the air delivered by each stroke of each piston in reverse directions through said tubes, substantially as described.

In testimony whereof I affix my signature in presence of two witnesses.

JOHN GEORGE LEYNER.

Witnesses:
   CLARENCE A. LAWSON,
   GEORGE R. GRIEVE.